United States Patent
Shida

(10) Patent No.: US 7,386,469 B1
(45) Date of Patent: Jun. 10, 2008

(54) METHOD, SYSTEM, AND APPARATUS FOR ACCEPTING TRANSACTION RESERVATION, AND RECORDING MEDIUM

(75) Inventor: Tomohito Shida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 09/693,919

(22) Filed: Oct. 23, 2000

(30) Foreign Application Priority Data

Mar. 16, 2000 (JP) .............................. 2000-074889

(51) Int. Cl.
G06Q 30/00 (2006.01)
G07G 1/14 (2006.01)

(52) U.S. Cl. ...................................................... 705/14
(58) Field of Classification Search .................. 705/14
See application file for complete search history.

(56) References Cited

U.S. PATENT DOCUMENTS

| | | | |
|---|---|---|---|
| 5,712,985 A * | 1/1998 | Lee et al. ...................... | 705/7 |
| 5,797,127 A * | 8/1998 | Walker et al. .................. | 705/5 |
| 5,918,209 A * | 6/1999 | Campbell et al. .............. | 705/5 |
| 5,948,040 A * | 9/1999 | DeLorme et al. ........... | 701/201 |
| 5,987,420 A * | 11/1999 | Maeda et al. .................. | 705/5 |
| 6,078,893 A * | 6/2000 | Ouimet et al. ................. | 705/10 |
| 6,266,648 B1 * | 7/2001 | Baker, III ..................... | 705/14 |
| 6,477,533 B2 * | 11/2002 | Schiff et al. ................... | 707/10 |
| 6,584,447 B1 * | 6/2003 | Fox et al. ...................... | 705/10 |
| 6,622,125 B1 * | 9/2003 | Cragun et al. ................. | 705/14 |
| 2001/0044788 A1 * | 11/2001 | Demir et al. ............... | 705/400 |
| 2002/0004759 A1 * | 1/2002 | Bradford et al. .............. | 705/26 |
| 2002/0133385 A1 * | 9/2002 | Fox et al. ...................... | 705/7 |
| 2005/0137011 A1 * | 6/2005 | Walker et al. ................. | 463/25 |
| 2005/0222865 A1 * | 10/2005 | Fox ............................... | 705/1 |

FOREIGN PATENT DOCUMENTS

| | | |
|---|---|---|
| JP | 7-44771 | 2/1995 |
| JP | 7-160950 | 6/1995 |
| JP | 7-249178 | 9/1995 |
| JP | 9-180063 | 7/1997 |
| JP | 10-97584 | 4/1998 |
| JP | 10-149487 | 6/1998 |
| JP | 11096244 A * | 4/1999 |

OTHER PUBLICATIONS

Eric Copage, Tables Are Waiting on the Internet, New York Times, NY, NY, Nov. 24, 1999.*
Kamoshida, Akira, "Kinyuu e-Business Kakumei (*Financial e-Business Revolution*)", Nikkan Kogyo Shimbun Ltd., Jan. 30, 2000, pp. 85-86.
Japanese Patent Office Action, mailed Oct. 10, 2006, and issued in corresponding Japanese Patent Application No. 2000-074889.

* cited by examiner

*Primary Examiner*—Arthur Duran
(74) *Attorney, Agent, or Firm*—Staas & Halsey LLP

(57) ABSTRACT

There are offered an accepting method for transaction reservation, system and apparatus to execute the method and a recording medium in which terms, such as a discount rate in transaction, for a transaction target such as products are disclosed on a network, and a lot of customers may promptly have information that discount bargains are available, and, moreover, the number of customers who desire to receive the offered discount bargains may be previously obtained by accepting reservation to perform the above transaction based on the above terms.

18 Claims, 12 Drawing Sheets

FIG. 3

| SHOP ID 40a | DATE 40b | TIME 40c | BARGAIN TARGET 40d | DISCOUNT RATE (%) 40e |
|---|---|---|---|---|
| A | 1999/11/10 | 9:00~11:00 | UNIFORMLY | 10 |
| B | 1999/11/10 | 19:00~20:00 | ASSORTED SLICED RAW FISH | 20 |
| ... | ... | ... | ... | ... |

FIG. 4A

| TIME | 10 | 11 | 12 | 13 | 14 | 15 | 16 | 17 | 18 | 19 | 20 |
|---|---|---|---|---|---|---|---|---|---|---|---|
| TARGET NUMBER OF PERSONS | 200 | 200 | 150 | 200 | 200 | 200 | 200 | 200 | 200 | 150 | 200 |
| PROSPECTIVE NUMBER OF PERSONS | 50 | 70 | 50 | 70 | 80 | 100 | 150 | 150 | 100 | 60 | 50 |

FIG. 4B

| DAY OF WEEK | MON | TUE | WED | THU | FRI | SAT | SUN |
|---|---|---|---|---|---|---|---|
| COEFFICIENT (%) | 60 | 70 | 70 | 70 | 80 | 120 | 150 |

FIG. 4C

| WEATHER | SUNNY | CLOUDY | RAINY |
|---|---|---|---|
| COEFFICIENT (%) | 100 | 100 | 80 |

FIG. 4D

| RESERVATION RATE (%) | 0 | 10 | 20 | 30 | 40 | 50 | 60 | 70 | 80 | 90 | 100 |
|---|---|---|---|---|---|---|---|---|---|---|---|
| DISCOUNT RATE (%) | 40 | 30 | 30 | 30 | 20 | 20 | 20 | 20 | 10 | 10 | 10 |

FIG. 5

| CUSTOMER ID | SHOP ID | DATE AND TIME | RESERVATION DATA | RESERVATION ID |
|---|---|---|---|---|
| 123456 | A | 1999/11/10 10:00 | UNIFORM DISCOUNT RATE 10% | 1 |
| 333333 | B | 1999/11/10 19:00 | ASSORTED SLICED RAW FISH DISCOUNT RATE 20% | 2 |
| ... | ... | ... | ... | ... |
| 42a | 42b | 42c | 42d | 42e |

FIG. 11

| CUSTOMER ID (43a) | SHOP ID (43b) | POINT (43c) |
|---|---|---|
| 123456 | A | 500 |
| 333333 | B | 196 |
| ⋮ | ⋮ | ⋮ |

METHOD, SYSTEM, AND APPARATUS FOR ACCEPTING TRANSACTION RESERVATION, AND RECORDING MEDIUM

BACKGROUND OF THE INVENTION

The present invention relates to a method for accepting transaction reservation, in which charges to offer products or services are presented on a network, and reservation to pay the above charges for the products or the services is accepted; a system and an apparatus for accepting transaction reservation to execute the above method; and to a recording medium to store computer programs which cause a computer to function as the above apparatus.

In a shop to offer various kinds of products and services, there have been a time zone (hereinafter, called as a quiet time zone) when only a few customers visit there, according to characters of the products or services which are handled there. There may be quiet time zones between breakfast and lunch, and between lunch and supper, for example, in a shop such as a restaurant to offer dishes. On the other hand, a shop such as a supermarket may have quiet time zones during lunch, supper and the like.

However, it may be preferable to shorten such quiet time zone as much as possible in order to efficiently offer the products or services. Then, there have conventionally been a sale time zone when the products and services are sold at discount prices lower than usual ones in order to shorten the above quiet time zone.

For example, in a shop such as a supermarket, products which should be sold on that day, and left unsold just before the end of business hours have been generally offered as a bargain at a discount price. Thereby, it has been realized to reduce the number of products left unsold to the minimum.

In each shop, there have been performed operations to exchange price tags, price tables, and so on showing usual charges to ones with discount charges to offer such time-limited services and bargain products (hereinafter, called as discount services). And, there have been calling customers in, handing out leaflets, and so on, in front of the shop to advertise that the products or services are offered at discount charges.

However, it is difficult to promptly perform the above exchanging of price tags, price tables, and so on, calling and handing out of leaflets in front of the shop, as they have required much hard labor. Therefore, there have been a problem that it is impossible to change discount charges defined at discount sales into appropriate ones according to momentarily changing conditions.

Similarly, it has been difficult to perform the above operations on a large scale, as much labor has been required. Therefore, there has been a problem that it is impossible for customers to easily obtain information that discount sales are in progress. Accordingly, there has been a problem that it is difficult to level this number of customers in the shop, that is, to shorten the quiet time zones.

Recently, communication networks, for example, the Internet has been rapidly widespread along with development of building up of communication environments, and then, computer systems offering various kinds of services has been realized, using such communication networks. The above computer systems may offer promptly and on a large scale with less labor in comparison with that manual labors.

BRIEF SUMMARY OF THE INVENTION

The present invention has been made, considering the above progress of computer systems, and has an object to provided a method for accepting transaction reservation, in which terms for a transaction target are defined and disclosed on a network, and a lot of customers may promptly have information that discount services are available, by accepting reservation to perform the transaction based on the above terms, and, moreover, to perform reservation for the discount service; a system and apparatus for accepting transaction reservation to execute the above method; and a recording medium to store computer programs which make a computer function as the above apparatus.

Another object of the present invention is to provide a method for accepting transaction reservation to define appropriate terms according to momentarily changing conditions, by definition of terms for transaction such as a discount rate in a discount service, based on reservation states for the transaction; a system and an apparatus for accepting transaction reservation, and a recording medium for them.

Further another object of the present invention is to provide a method for accepting transaction reservation, in the case of execution of transaction based on specific terms, to perform transaction based on the specific terms only when it is confirmed that the transaction reservation has been actually made, after checking whether the reservation has been made or not; a system and an apparatus for accepting transaction reservation; and a recording medium for them.

Still another object of the present invention is to provide a method for accepting transaction reservation, in the case of confirmation that transaction reservation has been made based on specific terms, to offer favors according to the above terms instead of performing transactions based on the above terms; a system and an apparatus for accepting transaction reservation; and a recording medium for them.

The method according to a first invention is characterized in that a method for accepting transaction reservation, comprising the steps of: electronically presenting information on transaction favors of a transaction target defined for each time zone or time period to a plurality of customers; electronically accepting information on transaction reservation at a selected time zone or time period by a customer; and performing a transaction with favors for the reserved transaction target, when the visiting time of a customer to a shop, or the finish time of the transaction is included in the time zone or time period in association with said accepted information on transaction reservation.

The method according to a second invention is characterized in that a method for accepting transaction reservation of a transaction target, comprising the steps of: determining terms for a transaction of a transaction; displaying the determined terms for the transaction; and accepting reservation of transaction of the transaction target based on the displayed terms.

The method according to a third invention is characterized in that, in the method according to a second invention, the step of determining the terms for a transaction is a step of determining terms for a transaction based on the state of the transaction reservation.

The method according to a fourth invention is characterized in that, in the method according to the second or third invention, the accepting step further comprises a step of confirming whether the reservation has been accepted.

The method according to a fifth invention is characterized in that, a reception method for deal booking according to claim 4, characterized in that it further comprises the following steps: a method according to claim 4, further comprising the steps of: determining favors for the reserved transaction which has been confirmed to be accepted by the confirmation step, based on its terms; and offering the determined favors.

The system according to a sixth invention is characterized that, a system for accepting transaction reservation provided with a plurality of terminal devices, and an apparatus for accepting transaction reservation, connected to the terminal devices respectively, to accept reservation for a transaction of a transaction target, characterized in that said accepting apparatus comprises: (i) a terms determination means for determining terms for a transaction of a transaction target; and (ii) a transaction terms display means for displaying the terms for the transaction determined by the terms determinations means; said terminal devices comprises: (i) an accepting means for accepting reservation application data which represents reservation application for a transaction of a transaction target based on the displayed terms; and (ii) a transmission means for transmitting the reservation application data accepted by the accepting means to the accepting apparatus; and said accepting apparatus further comprises a storage means for storing received reservation application data, when the reservation application data is received.

The apparatus for accepting transaction reservation to accept reservation application for a transaction of a transaction target, according to a seventh invention is comprising: a terms determination means for determining terms for a transaction of a transaction target; a transaction terms display means for displaying the determined terms for the transaction by the terms determination means; and a storage means for storing the reservation application data which represents reservation application for a transaction of a transaction target based on the transaction terms displayed by the terms display means, when the reservation application data is input.

The recording medium according to a eighth invention is characterized that, a computer-readable recording medium storing programs to make a computer accept reservation application for a transaction of a transaction target, said programs comprises: a program code means for causing a computer, to determine terms for a transaction of a transaction target; a program code means for causing a computer to display the determined terms; and a program code means for causing a computer to store reservation application data which represents reservation application for a transaction based on the displayed transaction terms, when the reservation application data is input.

In the first invention, information on transaction favors for a transaction target defined for each time zone, which is divided at least with regards to coming time of customers to the shop, are electronically presented to a plurality of customers. And, information on transaction reservation showing transaction reservation at the time zone selected by the customer are accepted electronically. Then, a transaction with favors for the reserved transaction target is performed, when coming time of the customer to the shop, or the finish time of the transaction is included in the time zone in association with the above information on transaction reservation.

As mentioned above, a lot of customers may be able to promptly have information, by electronic presentation of the information of transaction favors, that special services such as special prices at a sale time zone and bargain products are offered.

Customers may perform transaction reservation without a geographic restriction by electronic accepting of information on transaction reservation, and receive the favors shown in information on transaction favors, by performing deals based on the above booking.

Here, the finish time of the transaction means the purchase time in the case of purchasing products at the shop, or time to receive services in the case of receiving offered service.

In the second, sixth, and seventh inventions, terms for reserved transaction target are defined and displayed. Then, reservation to perform transaction of a transaction target is accepted, based on the above displayed terms.

Thus, a lot of customers may promptly have information, by disclosure of defined terms for transactions, that special services are offered.

It may be possible to predict, by accepting reservation to perform transaction based on the above terms for transaction, to what degree of transactions based on the terms are actually performed. Thereby, they in a shop may obtain information to what degree of products should be prepared.

In the third invention, terms for transaction are defined based on reservation states for transaction. Appropriate terms for transactions may be defined, corresponding to conditions momentarily changing as time has elapsed.

In the fourth invention, it is confirmed whether reservation for the transaction has been actually performed, in performing transaction reserved based on the terms.

Thereby, as for special services such as special prices at a sale time zone and bargain products, only customers who have reserved to receive the above services may receive the above services, and other customers may not enjoy the above services. Therefore, customers may be promoted to reserve to receive such special services, in order to receive them.

In the fifth invention, after confirming that transaction reservation has been performed based on specific terms for transaction, favors corresponding to the above terms may be offered to customers.

Thus, favors corresponding to the above terms for transaction, points, for example, having monetary values are given to the customer who has come to a shop after reservation, instead of performing transactions based on specific terms for transactions. Thereby, as there is no apparent sign that special services based on specific terms for transaction are offered, customers who have come to the shop without reservation have no feeling that they are suffered from any feeling of loss.

The above and further objects and features of the invention will be more fully be apparent from the following detailed description with accompanying drawings.

BRIEF DESCRIPTION OF THE SEVERAL VIEWS OF THE DRAWING

FIG. 3 shows a conceptual diagram of a format example of a file stored in a bargain data base (DB);

FIGS. 4A through 4D show conceptual diagrams of format examples of a table stored in a basic data DB;

FIG. 5 shows a conceptual diagram of a format example of a file stored in a reservation data DB;

FIG. 11 shows a conceptual diagram of a format example of a file stored in a favored point DB.

DETAILED DESCRIPTION OF THE INVENTION

Embodiment 1

Figure 1:
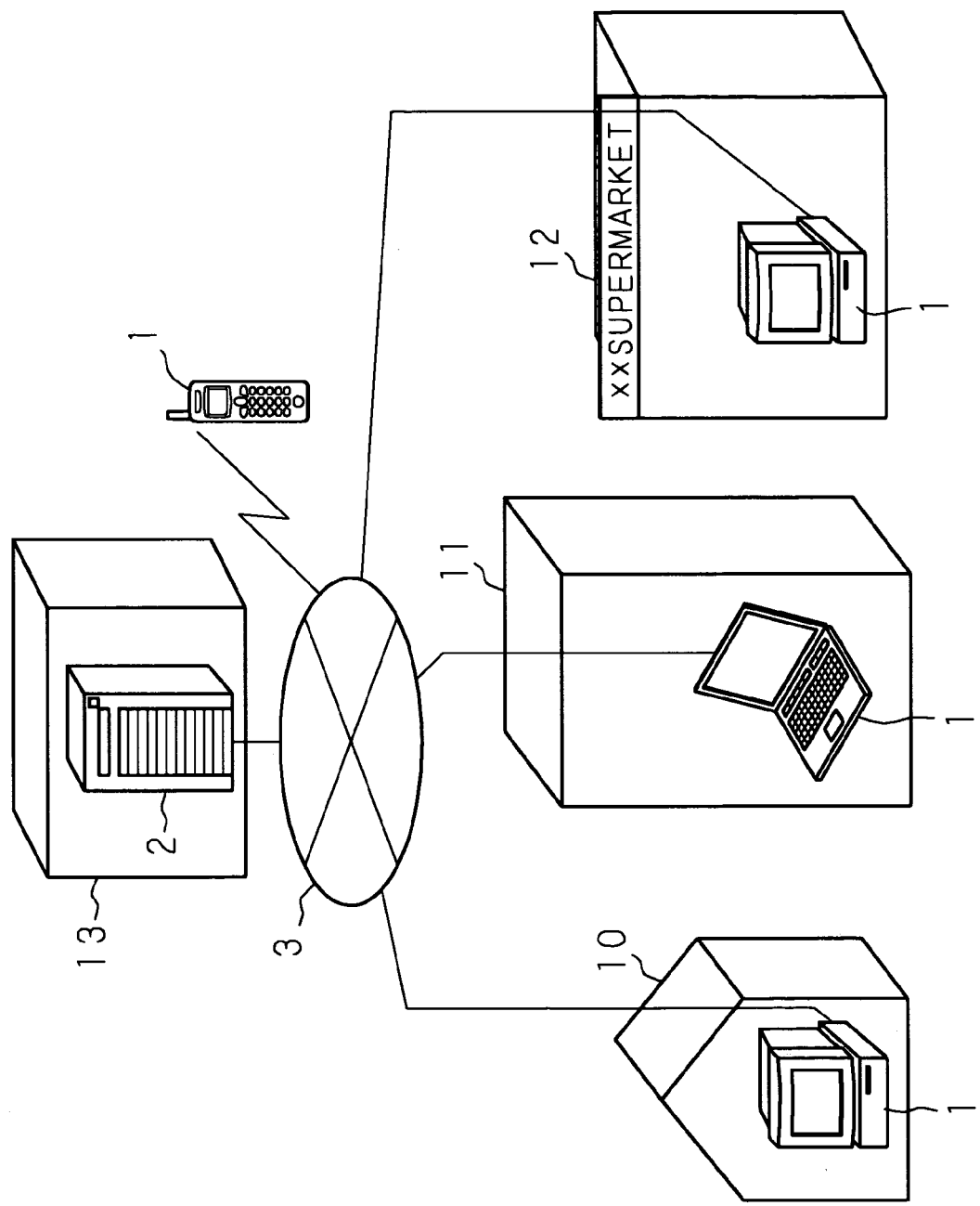
FIG. 1 shows a block diagram of a configuration of a system for accepting transaction reservation according to embodiment 1 of the present invention.

FIG. 1 shows a block diagram of a configuration of the system for accepting transaction reservation according to embodiment 1 of the present invention. In FIG. numerals 1, 1, 1 . . . show terminal devices, which are provided in customer's home 10 and office 11, and a shop 12. In the customer's home 10 and office 11, confirmation of the contents of services which are offered at each shop, and reservation are performed by the customer through the terminal devices 1, 1 . . . . When the terminal devices 1, 1 . . . are portable devices such as portable telephones, it may be possible for the customer to perform the confirmation of the contents of services, and the reservation of them at any required time and at any necessary place.

In the shop 12, registration of service contents and basic data for definition of the service contents, confirmation of reservation contents, and so on are performed by employees of the shop 12 through the terminal devices 1, 1 . . . .

An apparatus for accepting transaction reservation 2 for performing communications with the terminal devices 1, 1 . . . is connected to a network 3, and provided in, for example, a machine center 13 managed by a plurality of shops. The accepting apparatus 2 is not limited to the above provision and may be also installed in the shop, or may be consigned to a service provider, and so on.

Figure 2:
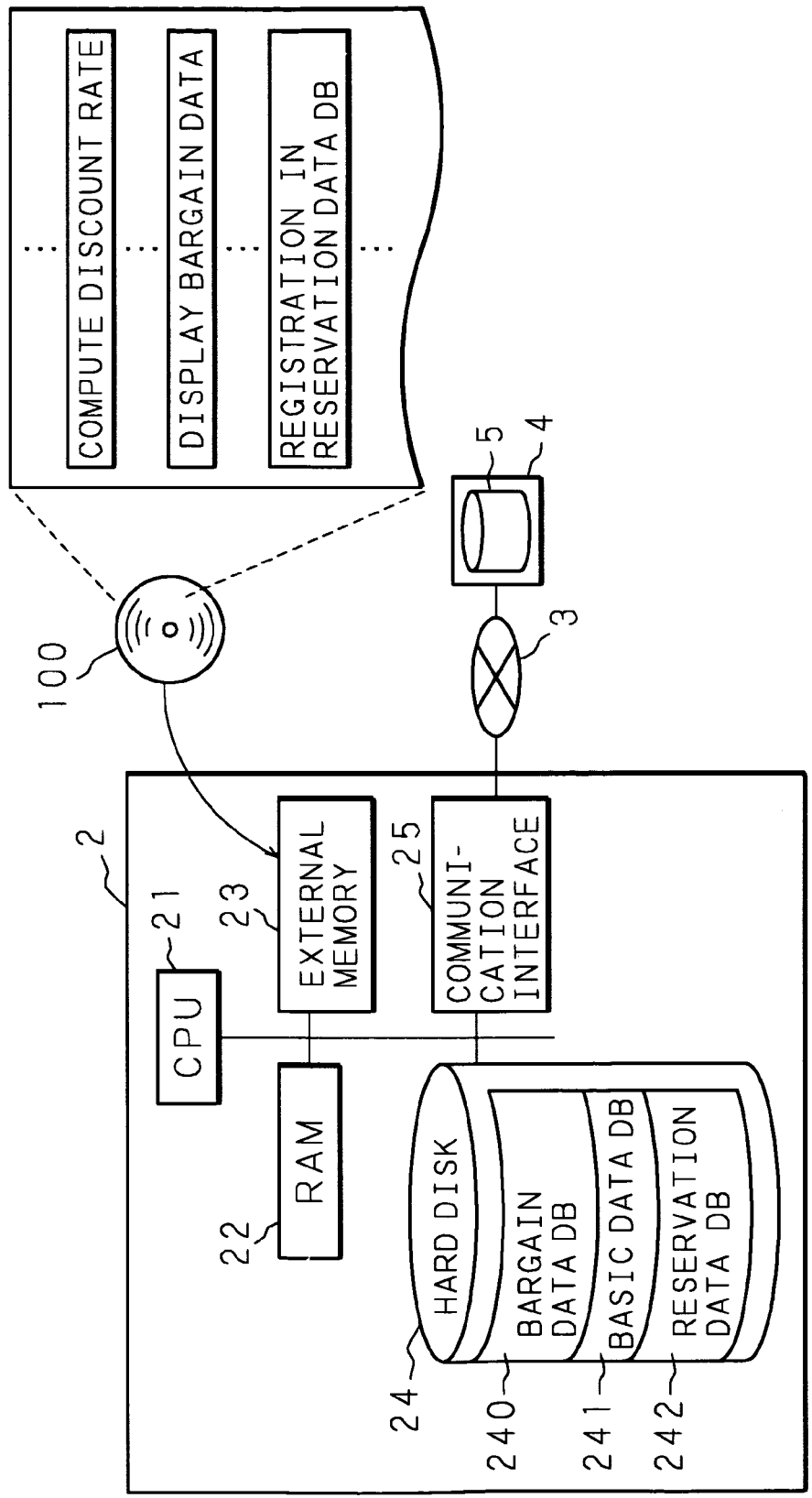
FIG. 2 shows a block diagram of a configuration of an apparatus for accepting transaction reservation according to embodiment 1 of the present invention.

FIG. 2 shows a block diagram of a configuration of the apparatus for transaction reservation 2 according to embodiment 1 of the present invention. In FIG. 2, the accepting apparatus 2 for transaction reservation has a CPU 21, to which a RAM 22 to store data generated in the above CPU 21, an external memory 23 comprising a CD-ROM drive or a flexible disk drive, and so on to read programs of the apparatus for accepting transaction reservation 2 according to embodiment 1 of the present invention from a portable recording medium 100 such as a CD-ROM, or a flexible disk storing the above programs, a hard disk 24 to store programs of the present invention read through the above external memory 23, and a communication interface 25 for connection with the above network 3 are connected.

The above hard disk 24 comprises three data bases (a bargain data DB 240, a basic data DB 241, and a reservation data DB 242) described later.

The programs of the apparatus for accepting transaction reservation 2 according to embodiment 1 of the present invention may be read from the above portable recording medium 100, and, moreover, may be downloaded, by connection to an external server computer 4 through the network 3, from a recording medium 5, which is installed in the above external server computer 4 and stores the above programs, to the above apparatus for accepting transaction reservation 2. The above accepting device 2 may execute the processing described below by storing the downloaded programs in the above hard disk 24, and by loading the stored programs to the RAM 22 by the CPU 21.

Then, the above three data bases will be described below. A first data base, that is, the bargain data DB 240 stores bargain data (i.e. service data) on special services at a specified time zone such as a sale time zone. The above bargain data is received from the terminal devices 1, 1 . . . according to the procedure described below.

FIG. 3 shows a conceptual diagram of a format example of a file stored in the bargain data DB 240. As shown in FIG. 3, five fields, that is, a shop ID field 40*a*, a date field 40*b*, a time field 40*c*, and a field for bargain target 40*d*, and a discount rate field 40*e* are provided in the bargain data DB 240.

A shop identifier (hereinafter, called as a shop ID) to identify the shop, a date when services offered by the shop are performed, and time when the services are performed are stored in the shop ID field 40*a*, the date field 40*b*, and time field 40*c*, respectively.

And, product names of target products for special services, and discount rates applied to the above products are stored in the field of bargain target 40*d*, and the discount rate field 40*e*, respectively. Moreover, the above discount rate is calculated according to the procedure described below.

The format example shown in FIG. 3 denotes that, for example, in a shop with a shop ID "A", all the products dealt in the shop are uniformly discounted at 10% in their prices between 9 a.m. and 11 a.m. on Nov. 10, 1999.

A second data base, that is, the basic data DB 241 stores a various kinds of data (hereinafter, called as basic data), which are used for calculation of the above discount rate, in a form of a table. The above basic data are received from the terminal devices 1, 1 . . . , according to the procedure described below.

FIG. 4 shows a conceptual diagram of a format example of a table stored in the basic data DB 241. FIG. 4A shows a table with a target number of persons coming to a shop and a prospective number of the persons, in which the target number of persons coming to the shop and the prospective number of the persons at each time zone are defined and stored. FIGS. 4B and 4C show a day-of-week coefficient table and a weather coefficient table, respectively. The above coefficients are defined for each day-of-week and each weather, according to the prospective number of persons coming to the shop, and stored in the above tables, respectively. Moreover, FIG. 4D shows a discount rate table which stores discount rates corresponding to reservation rates calculated according to the procedure described below.

The table stored in the basic data DB 241 is not limited to the above table, and for example, a table including coefficients defined according to prospective number of persons coming to the shop for each month or each temperature may be stored. Moreover, the above tables are prepared and stored in each shop.

A third database, that is, the reservation data DB 242 stores reservation data on the reservation accepted from each customer. And the above reservation data is received from the terminal devices 1, 1 . . . according to the procedure described later.

FIG. 5 shows a conceptual diagram of a format example of a file stored in a reservation data DB 242. As shown in FIG. 5, five fields, that is, a customer ID field 42*a*, a shop ID field 42*b*, a date and time field 42*c*, and a reservation data field 42*d*, and a reservation ID field 42*e* are provided in the reservation data DB 242.

A customer identifier (hereinafter, called as a customer ID) to identify each customer and a shop ID for each shop are stored in the customer ID field 42*a* and the shop ID field 42*b*, respectively. Moreover, a date and time when the reservation has been accepted, data showing the contents of the reservation, and a reservation identifier (hereinafter, called as a reservation ID) to identify the reservation are stored in the date and time field 42*c*, the reservation data field 42*d*, and the reservation ID field 42*e*, respectively.

The format example shown in FIG. 5 denotes that, for example, at 10 a.m. on Nov. 10, 1999, a customer with a customer ID of 123456" has reserved a discount service that all the products in a shop with a shop ID of "A" will be sold at a discount rate of 10%, and the reservation ID is "1".

For example, in a shop having a membership system, an identifier for each member is used for a customer ID stored in the customer ID field 42*a*, and in a shop without such membership system, a name of each customer, and so on are used.

Then, the operation of the system for accepting transaction reservation of the embodiment of the present invention will be described.

Figure 6:
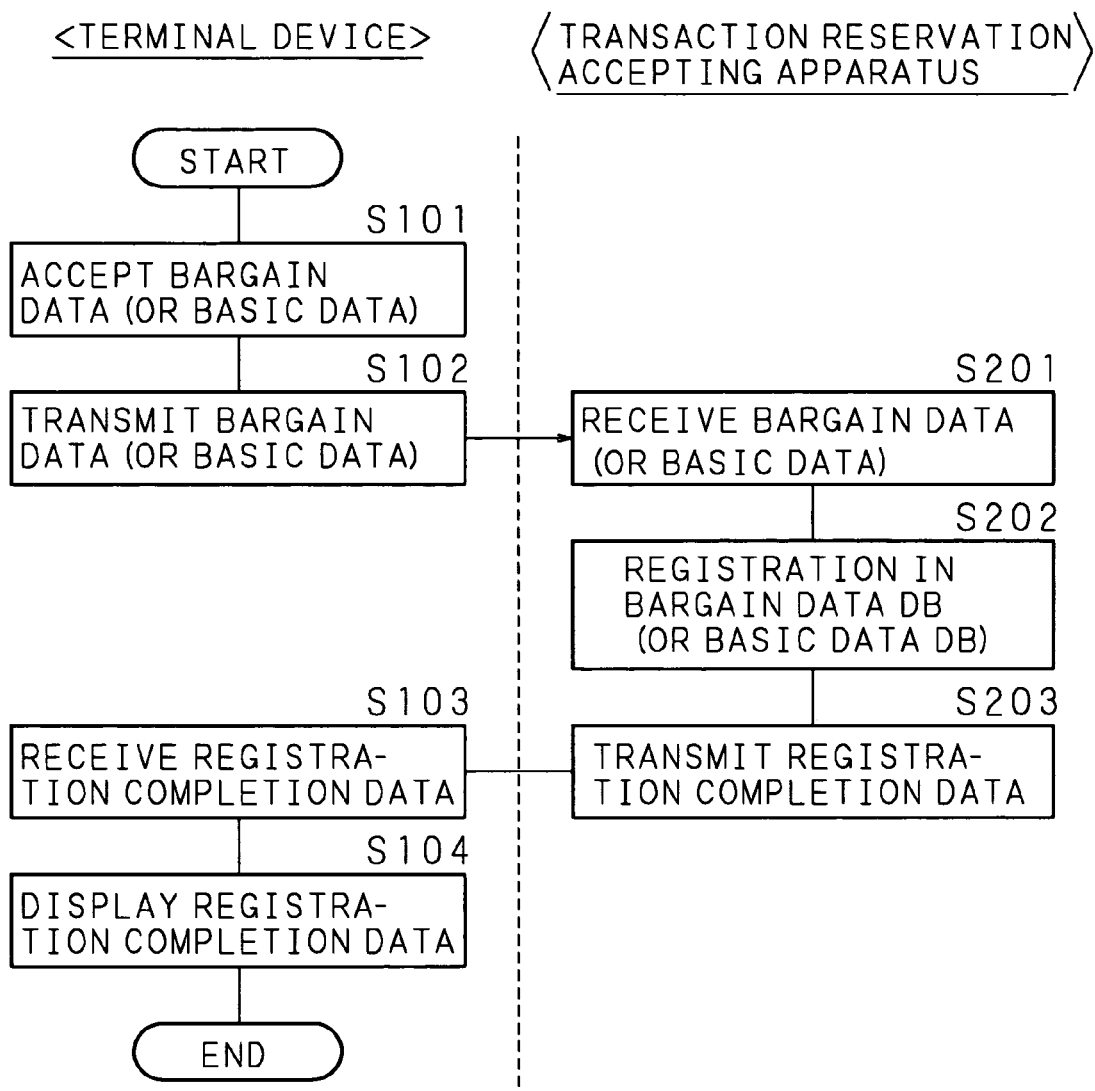
FIG. 6 shows a flow chart of an operation flow of a system for accepting transaction reservation according to embodiment 1 of the present invention at registration processing of bargain data, or basic data.

FIG. 6 shows a flow chart of an operation flow of a system for accepting transaction reservation according to the embodiment 1 of the present invention at registration processing of bargain data, or basic data.

The terminal devices 1, 1 . . . display a screen for promotion to input the bargain data (or, basic data) on the devices themselves. Employees of each shop, and so on input the bargain data (or, basic data) with respect to the screen.

When the bargain data (or, basic data) is received (S101), the terminal devices 1, 1 . . . transmit received bargain data (or, basic data) to the apparatus for accepting transaction reservation 2 (S102).

The apparatus for accepting transaction reservation 2 registers the received bargain data (or, basic data) in the bargain data DB 240 (or, basic data DB 241) (S202), when the bargain data (or, basic data) is received from the terminal devices 1, 1 . . . (S201), and transmits registration-completion data, denoting that the registration to the bargain data DB 240 (or, basic data DB 241) has been completed, to the terminal devices 1, 1 . . . (S203).

The devices 1, 1 . . . displays the received registration-completion data on the display screen of the terminal devices 1, 1 . . . (S104), when the registration-completion data is received from the apparatus for accepting transaction reservation 2 (S103).

Thereby, the employees of the shop and so on may register the desired bargain data (or, basic data) to the apparatus for accepting transaction reservation 2. The above registration processing is performed, whenever it is judged that the previously registered bargain data (or, basic data) is required to be changed.

Figure 7:
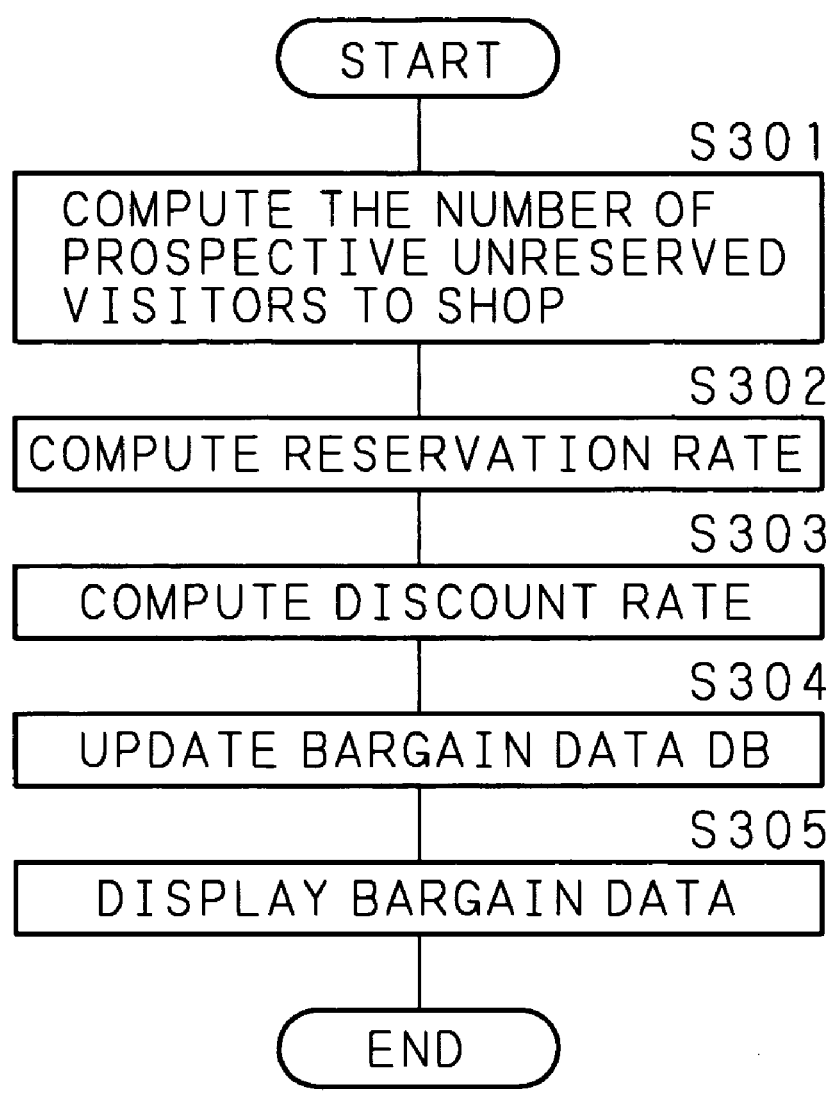
FIG. 7 shows a flow chart of an operation flow of an apparatus for accepting transaction reservation according to embodiment 1 of the present invention at display of bargain data.

FIG. 7 shows a flow chart of an operation flow of the apparatus for accepting transaction reservation 2 according to embodiment 1 of the present invention at display of the bargain data.

The apparatus for accepting transaction reservation 2 calculates prospective number of unreserved coming to a shop, that is, prospective number of customers coming to a shop without reservation (S301). The above calculation is performed with the product of the target number of persons coming to a shop shown in FIG. 4A, the prospective number of persons coming to a shop stored in the table with the prospective number of persons coming to the shop, the coefficients stored in the day-of-week coefficient table shown in FIG. 4B, and coefficients stored in the weather coefficient table shown in FIG. 4C. According to the calculation example, for example, the prospective number of persons coming to a shop without reservation at 10 a.m. on a rainy Saturday is calculated by the product of 50 (persons) for a prospective number of persons coming to a shop at 10 a.m., 80(%) for a weather coefficient on a rainy day, and 120(%) for a day-of-week coefficient on a Saturday to obtain 48 (persons).

Then, a reservation rate of the reservation which each customer has performed is calculated (S302) as described below, based on the prospective number of persons coming to the shop without reservation, which has been calculated at the step S301. The above calculation is performed by division of, for example, the reservation number showing cumulative number of reservation by a value obtained through subtraction of the above prospective number of persons coming to the shop without reservation from the target number of persons coming to the shop stored in the table, shown in FIG. 4A. According to the above calculation example, for example, when the reservation number at 10 a.m. on a rainy Saturday is 76, the reservation rate is calculated by division of 76 by subtraction of 48 from 200 to obtain 0.5, that is, 50(%).

Then, a discount rate for an offering service is calculated, based on the reservation rate calculated at the step S302 (S303). The above calculation is performed, using the discount rate table shown in FIG. 4D. That is, when the reservation rate is 50(%) as in the above example, the discount rate becomes 20(%).

The discount rate calculated as above is stored in a discount rate field 40*e* of the bargain data DB 240 to update the contents of the bargain data DB 240 (S304). The updated contents of the bargain data DB 240 is displayed (S305). Here, the display means the disclosure on the network 3. Each customer may confirm the contents of the bargain data DB 240, using the terminal devices 1, 1 . . . .

Moreover, the discount rate may be calculated by the apparatus for accepting transaction reservation 2 as shown above, but the rate may be also defined by the employees of each shop. In such a case, the employees transmit the discount rate to the apparatus for accepting transaction reservation 2, using the terminal devices 1, 1 . . . . Then, the apparatus for accepting transaction reservation 2 stores the received discount rate to the discount rate field 40*e* of the bargain data DB 240 and displays it.

The above processing may be also executed when display of the bargain data is required from the terminal devices 1, 1 . . . of customers. Moreover, after the steps S301 through S304 are executed at a regular interval, the step S305 may be configured to be executed when display of the bargain data is required from the terminal devices 1, 1 . . . of customers.

Figure 8:
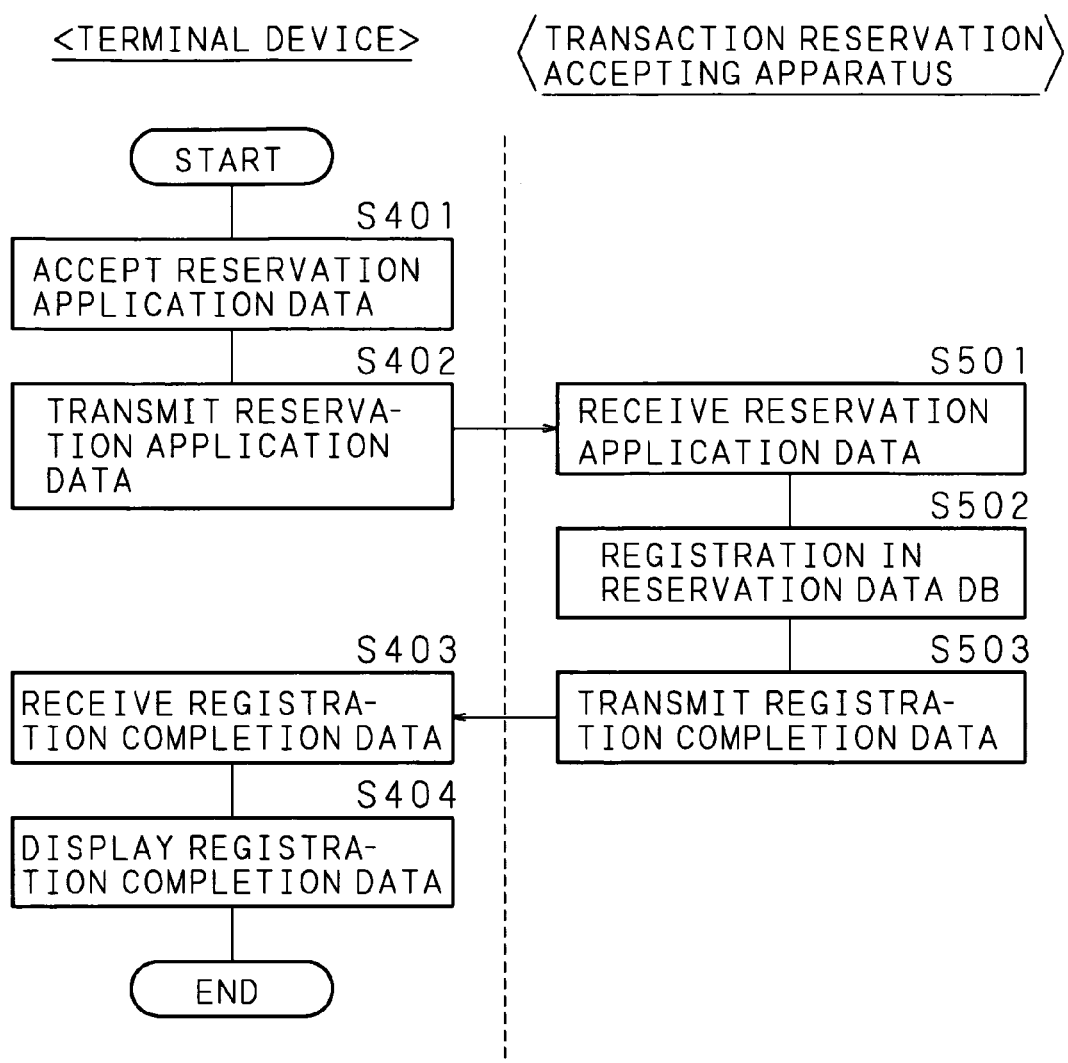
FIG. 8 shows a flow chart of an operation flow of a system for accepting transaction reservation according to embodiment 1 of the present invention at accepting reservation.

FIG. 8 shows a flow chart of an operation flow of the system for accepting transaction reservation according to embodiment 1 of the present invention at accepting reservation.

The terminal devices 1, 1 . . . display a screen for promotion to input the reservation application date showing the application of the reservation on the devices themselves. Each customer inputs the reservation application data with the devices.

When the reservation application data is received (S401), the terminal devices 1, 1 . . . send the received reservation application data to the apparatus for accepting transaction reservation 2 (S402).

The apparatus for accepting transaction reservation 2 registers the received reservation application data in the reservation data DB 242 (S502), when the reservation application data is received from the terminal devices 1, 1 . . . (S501), and transmits registration-completion data, denoting that the registration to the reservation data DB 242 has been completed, to the terminal devices 1, 1 . . . (S503). The registration-completion data includes a reservation ID numbered at registration to the reservation data DB 242.

The devices 1, 1 . . . display the received registration-completion information on the display screen of the devices themselves (S404), when the registration-completion data is received from the apparatus for accepting transaction reservation 2 (S403).

The above reservation ID may be numerals, bar codes, and the like. In the case of numerals for the reservation ID, the customer tells the reservation ID to a cashier by verbal communication at payment, after writing down the ID on a sheet of paper to bring it to the shop. In another embodiment, the numerals or the bar codes and so on for the reservation ID may be printed with a printer, and the customer may bring the printed one to the shop. In the above case, the reservation ID may be confirmed on the terminal devices 1, 1 . . . of the shop, using an optical character reader (OCR) or a bar code reader. Moreover, the terminal devices 1, 1 . . . may not be special devices for transaction reservation, but maybe a POS (point of sales) terminal.

In addition, the reservation ID may be stored in a memory device of a portable telephone, and brought to a shop to confirm the reservation ID by communication between the terminal devices 1, 1 . . . of the shop and the portable telephone.

Further, in a shop having a membership system, the presence of the reservation may be confirmed, using a number of member in stead of the reservation ID. In the above case, the confirmation of the reservation ID may be confirmed by collation between the customer ID stored in the customer ID field 42a of the reservation data DB 242 and the member number written on a member card, when the member card is read at payment.

Thereby, each customer may perform application of desired reservation, and, as there is a case to change the above reservation rate and the discount rate according to the reservation application, the apparatus for accepting transaction reservation 2 updates the bargain data DB 240 according to the above procedure, in the above case, and then discloses new bargain data on the network 3.

Each customer goes out to each shop at reserved time to tell the reservation ID at the shop. Then, the reservation may be confirmed according to a procedure described below.

Figure 9:
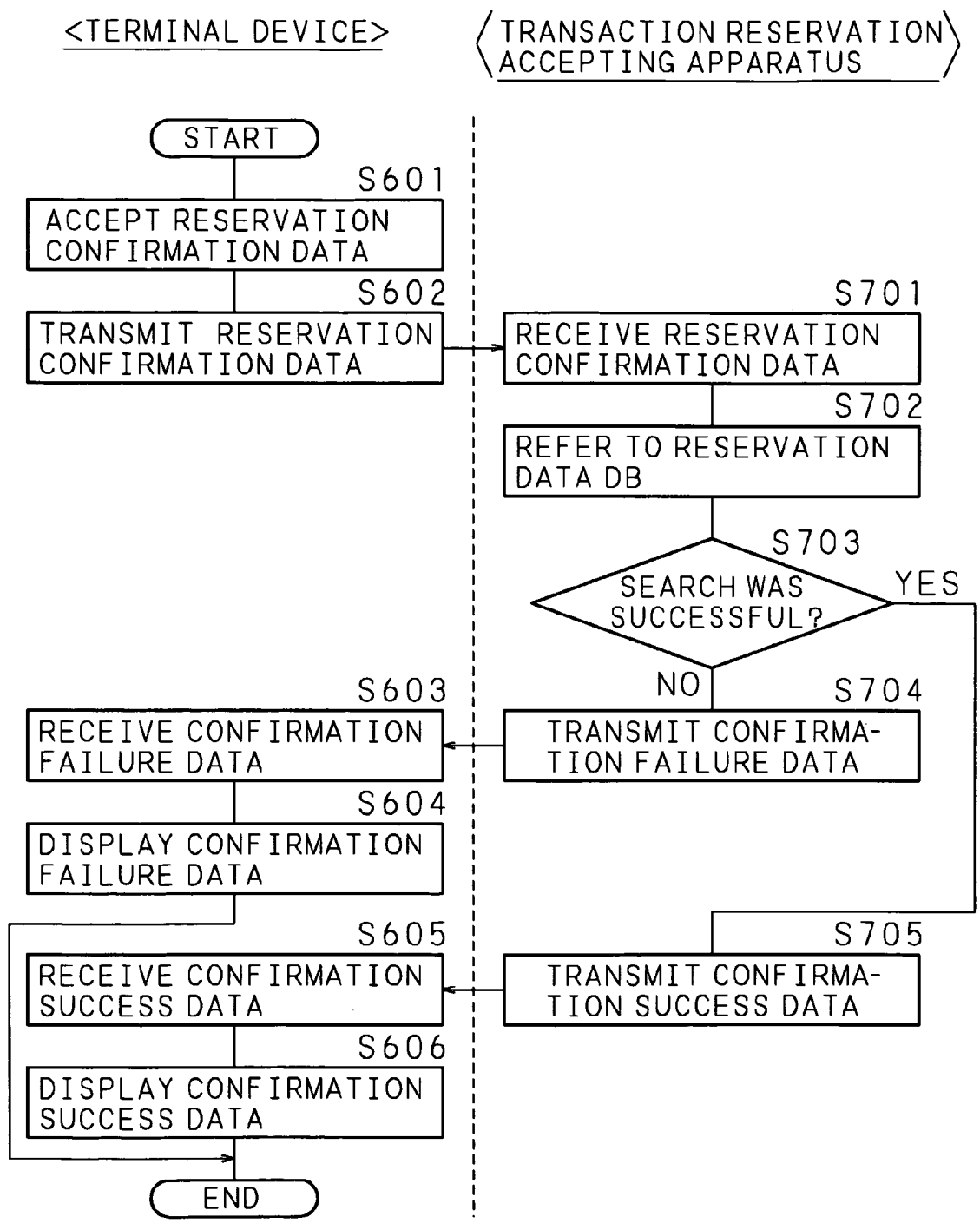
FIG. 9 shows a flow chart of an operation flow of a system for accepting transaction reservation according to embodiment 1 of the present invention at confirmation of reservation.

FIG. 9 shows a flow chart of an operation flow of the system for accepting transaction reservation according to embodiment 1 of the present invention at confirmation of reservation.

In each shop, the employees and so on input reservation confirmation data including the above reservation ID to the terminal devices 1, 1 . . . in order to confirm the reservation, when the reservation ID is told. The terminal devices 1, 1 . . . transmit the accepted reservation confirmation data to the apparatus for accepting transaction at reservation 2 (S602), when the reservation confirmation data is accepted (S601).

When the apparatus for accepting transaction reservation 2 receives the reservation confirmation data from the terminal devices 1, 1 . . . (S701), referring to the reservation data DB 242 (S702), the reservation ID included in the reservation confirmation data is retrieved as a key (S703). In the case of failure in the retrieval (NO at the step S703), the confirmation failure data showing that the reservation confirmation has not been performed is transmitted to the terminal devices 1, 1 . . . (S704).

The devices 1, 1 . . . display the received confirmation failure data on the display screen of the devices themselves (S604), when the confirmation failure data is received from the apparatus for accepting transaction reservation 2 (S603).

On the other hand, when there is success in the retrieval of the reservation data DB 242 at the step S703 (YES at the step S703), the confirmation success data showing that the reservation confirmation has been performed is transmitted to the terminal devices 1, 1 . . . (S705).

The devices 1, 1 . . . display the received confirmation success data on the display screen of the devices themselves (S606), when the confirmation success data is received from the apparatus for accepting transaction reservation 2 (S605).

Then, when the reservation has been confirmed, and the time of the above confirmation is included in the time zone shown in the reservation data, the customer may receive the services in association with the reservation.

Moreover, when the time of coming to the shop is included in the time zone shown in the reservation data, the customer may be also configured to receive the above services. In the above case, the time of coming to a shop of the customer may be configured to be identified, for example, by a method in which the customer receives a piece of paper with printed time of coming to the shop when the customer comes to the shop.

And, when the accepting service for transaction reservation realized by the system for accepting transaction reservation according to the present invention is performed by a service provider and so on as an agent, the service provider may claim the agency service charge from the side (a shop and so on) asking the services. In the above case, the claimed charge may be set as a constant amount, or it may be calculated based on the amount for the transaction, when the transaction in association with the reservation is actually performed.

Embodiment 2

Figure 10:
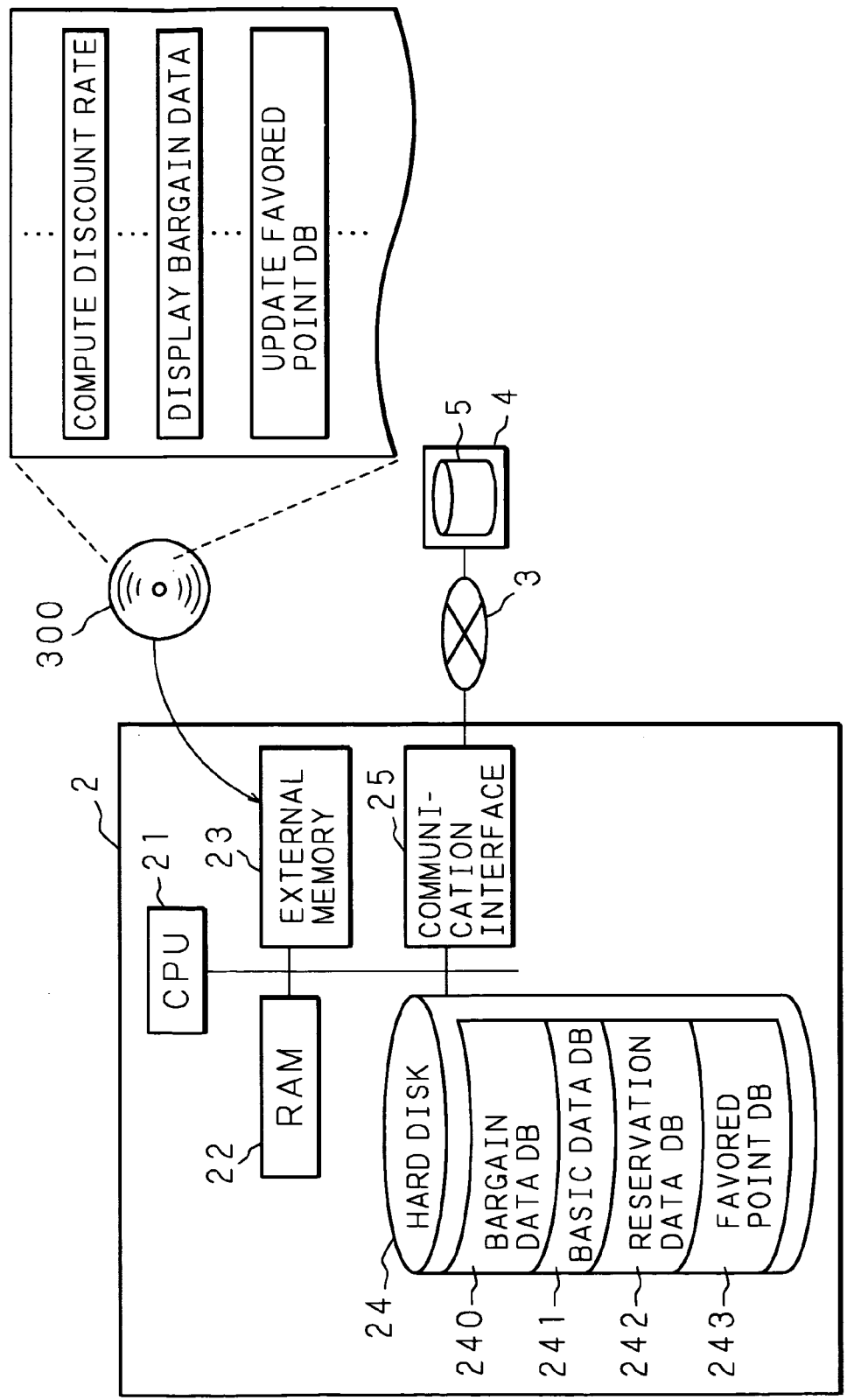
FIG. 10 shows a block diagram of a configuration of an apparatus for accepting transaction reservation according to embodiment 2 of the present invention.

FIG. 10 shows a block diagram of a configuration of the apparatus for accepting transaction reservation according to embodiment 2 of the present invention.

In the apparatus for accepting transaction reservation 2 according to embodiment 2 of the present invention, a fourth data base, that is, a favored point DB 243 is added to the hard disk 24, different from the apparatus for accepting transaction reservation 2 according to embodiment 1 of the present invention The programs in the apparatus for accepting transaction reservation 2 according to embodiment 2 of the present invention are stored in a portable recording medium 300. Moreover, the programs are stored in a recording medium 5 installed in an external server computer 4, and they may be downloaded. As the configurations, other than the above, are similar to those previously described with reference to embodiment 1, they are denoted by the same reference numerals, and the description will be eliminated.

FIG. 11 shows a conceptual diagram of a format example of a file stored in the above fourth data base, that is, a favored point DB 243.

As shown in FIG. 11, the favored point DB 243 has three fields, that is, a customer ID field 43*a*, a shop ID field 43*b*, and a point field 43*c*.

The customer ID field 43*a*, the shop ID field 43*b*, and the point field 43*c*, respectively, store a customer ID to identify each customer, a shop ID of each shop, and points corresponding to monetary values, with which, for example, a product with a value of ¥1 may be purchased by one point.

For example, the format example shown in FIG. 11 denotes that 500 points, which may be used in a shop with a shop ID of "A", are given to a customer with a customer ID of "123456".

Now, operation of the system for accepting transaction reservation according to embodiment 2 of the present invention will be described. But, the registration of the bargain data and basic data, the display of the bargain data, and the operation at each processing for accepting the reservation are similar to those of embodiment 1 to eliminate the description.

Figure 12:
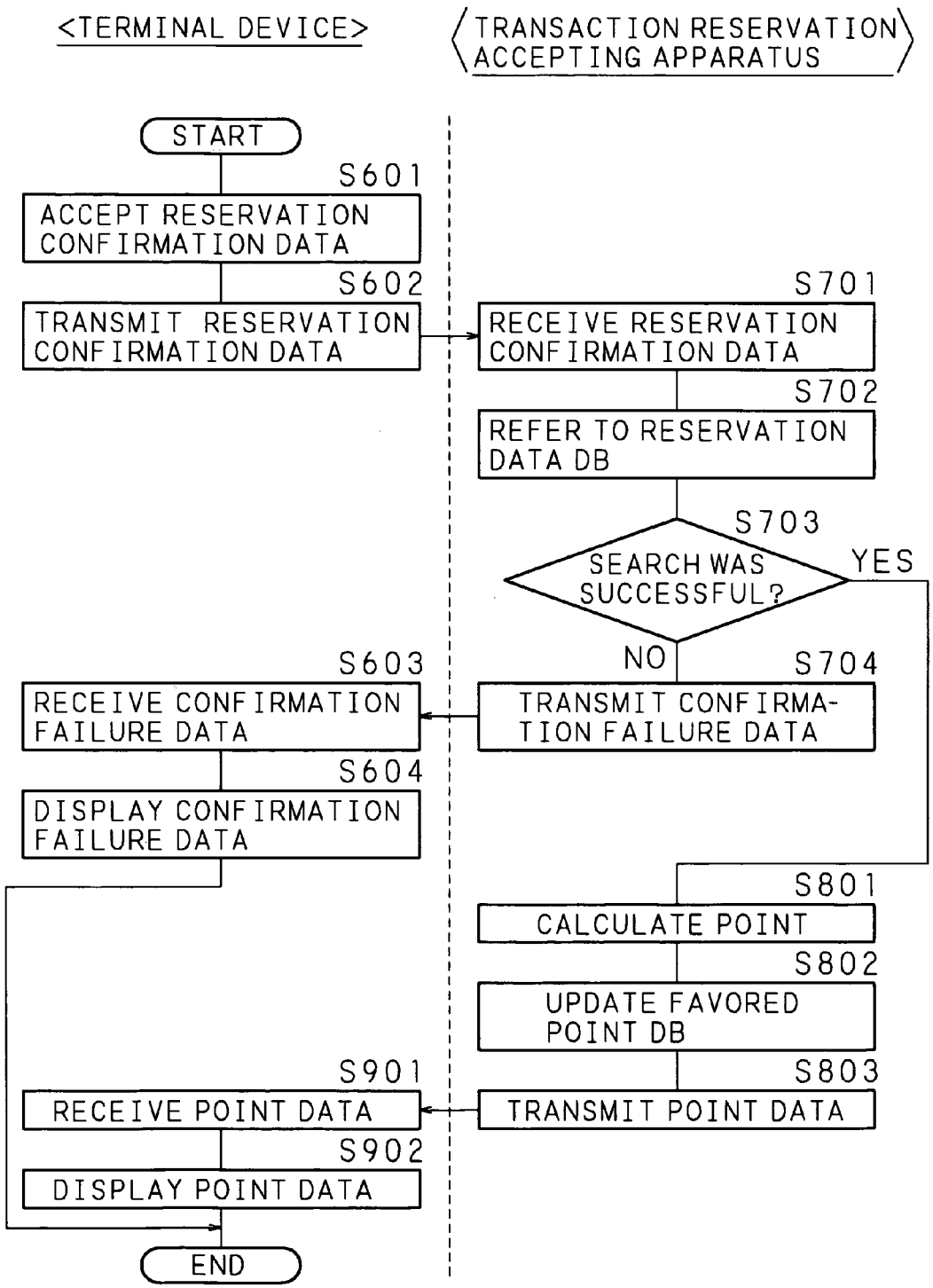
FIG. 12 shows a flow chart of an operation flow of a system for accepting transaction reservation according to embodiment 2 of the present invention at confirmation of booking.

FIG. 12 shows a flow chart of an operation flow of the system for accepting transaction reservation according to embodiment 2 of the present invention at confirmation of reservation. Processing similar to that in embodiment 1 is denoted by the same reference numerals, and its description will be eliminated.

In the case of the success in the retrieval of the reservation data DB 242 at the step S703 (YES at the step 703), points corresponding to the discount rate for the confirmed reservation is calculated (S801). The above calculation is performed by, for example, making points correspond to the charges equivalent to the discounted amount. According to the above calculation, the points become 500, when the discount rate for a products with a price of ¥5,000 is 10%.

The favored point DB 243 is updated by storing the point calculated as shown above in the point field 43*c* of the favored point DB 243 (S802). And, based on the updated contents, data on the newly added points and the cumulative points is transmitted to the terminal devices 1, 1 . . . (S803).

The devices 1, 1 . . . display the received point data on the display screen of the devices themselves (S902), when the point data is received from the apparatus for accepting transaction reservation 2 (S901).

In the present embodiment, the point calculation is performed when the reserved transaction is performed, but the above calculation may be performed at a predetermined time interval, or every predetermined cumulative number of transactions.

As mentioned above, when the reservation is confirmed, customers may obtain points corresponding to the contents of reserved services. Thereby, as there is no apparent sign that special services shown in the bargain data are offered, customers who have come to the shop without reservation have no feeling that they are suffered from any feeling of loss.

And, in the case of no execution of the reserved transaction, reduction in the cumulative points by an appropriate points may be performed. In the above case a fixed point previously determined may be reduced, or the reduced points may be calculated according to reserved products and services.

As this invention may be embodied in several forms without departing from the spirit of essential characteristics thereof, the present embodiment is therefore, illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for accepting a transaction reservation, comprising:
   electronically presenting information on discount services defined for each interval within a predetermined time period, where each interval reflects temporarily changing conditions of the discount services to a plurality of customers and the discount services are determined based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week, and weather conditions;
   electronically accepting information on the transaction reservation of discount services at a selected time interval by a customer; and
   performing a transaction according to the reserved discount services, when the visiting time of a customer to a shop, or the finish time of the transaction is included in the time interval in association with said accepted information of the transaction reservation.

2. A method for accepting a transaction reservation of a transaction target from a plurality of terminal devices connected with a system for accepting transaction reservations, comprising:
   determining terms for a transaction for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions where each interval within the predetermined time period reflects temporarily changing conditions of the terms for the transaction;
   displaying the determined terms for the transaction via at least one of the plurality of terminal devices; and
   accepting reservation of transaction of the transaction target based on the displayed terms.

3. A method according to claim 2, wherein the determination of the terms for a transaction comprises:
   determining terms for a transaction based on the state of the transaction reservation.

4. A method according to claim 2, wherein accepting reservation of a transaction further comprises:
   confirming whether the reservation has been accepted.

5. A reception method for deal booking according to claim 4, further comprising:
   determining discount services for the reserved transaction, which has been confirmed to be accepted based on terms for the transaction; and
   offering the determined discount services based on the confirmed reserved transaction.

6. A method according to claim 3, wherein accepting reservation of a transaction further comprises:
   confirming whether the reservation has been accepted.

7. A method according to claim 6, further comprising:
   determining discount services for the reserved transaction, which has been confirmed to be accepted based on terms for the transaction; and
   offering the determined discount services based on the confirmed reserved transaction.

8. A system for accepting transaction reservation provided with a plurality of terminal devices, and an apparatus for accepting transaction reservation, connected with the terminal devices respectively, to accept reservation for a transaction of a transaction target, characterized in that said accepting apparatus comprises:
   a terms determination means for determining terms for a transaction of a transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions, where each interval within the predetermined time period reflects temporarily changing conditions of the terms for the transaction; and
      a transaction terms display means for displaying the terms for the transaction determined by the terms determinations means;
   said terminal devices comprises:
      an accepting means for accepting reservation application data which represents reservation application for a transaction of a transaction target based on the displayed terms; and
      a transmission means for transmitting the reservation application data accepted by the accepting means to the accepting apparatus; and
   where said accepting apparatus further comprises a storage means for storing received reservation application data, when the reservation application data is received.

9. An apparatus for accepting transaction reservation to accept reservation application for a transaction of a transaction target, comprising:
   a terms determination means for determining terms for a transaction of a transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions where each interval within the predetermined time period reflects temporarily changing conditions of the terms for the transaction;
   a transaction terms display means for displaying the determined terms for the transaction by the terms determination means; and
   a storage means for storing the reservation application data which represents reservation application for a transaction of a transaction target based on the transaction terms displayed by the terms display means, when the reservation application data is input.

10. A computer-readable recording medium storing programs to make a computer accept reservation application for a transaction of a transaction target, said programs operations comprising:
    causing a computer, to determine terms for a transaction of a transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions, where each interval within the predetermined time period reflects temporarily changing conditions of the terms for the transaction;
    causing a computer to display the determined terms; and
    causing a computer to store reservation application data which represents reservation application for a transaction based on the displayed transaction terms, when the reservation application data is input.

11. A system for accepting transaction reservation provided with a plurality of terminal devices, and an apparatus for accepting transaction reservation, connected with the terminal devices respectively, to accept reservation for transaction of a transaction target, characterized in that said accepting apparatus comprises a storage medium and a controller coupled to the storage medium, and capable of performing the following operations:
    determining terms for a transaction of a transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week, and weather conditions, where each interval within the predetermined time period reflects temporarily changing conditions of the terms for the transaction; and
    displaying the determined terms for the transaction;
    said terminal device comprises a storage medium and a controller coupled to the storage medium, and capable of performing the following operations:
    accepting reservation application data which represents reservation application for a transaction of a transaction target based on the displayed terms; and
    transmitting the accepted reservation application data to the accepting apparatus; and
    the controller of said accepting apparatus is further capable of storing the received reservation application data in the storage medium, when the reservation application data is received.

12. An apparatus for accepting transaction reservation to accept reservation application for a transaction of a transaction target, comprising:

a storage medium; and a controller coupled to the storage medium, and performing operations including:

determining terms for a transaction of a transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week, and weather conditions where each interval within the predetermined time period reflects temporarily changing conditions of the terms for the transaction;

displaying the terms for the determined transaction; and storing the reservation application data which represents reservation application for a transaction of a transaction target based on the displayed transaction terms in the storage medium, when the reservation application data is input.

13. A method for accepting a transaction reservation for a transaction target from a plurality of terminal devices connected with a system for accepting transaction reservations, comprising:

presenting bargain data in relation to the transaction target, the bargain data presented reflecting temporary time dependent changes and based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions; and accepting the transaction reservation for the transaction target via the system for accepting transaction reservations, and performing the transaction in accordance with the transaction reservation.

14. A method for accepting a transaction reservation for a transaction target from a plurality of terminal devices connected with a system for accepting transaction reservations, comprising:

presenting bargain data in relation to the transaction target, the bargain data reflecting temporary time dependent changes and based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction and weather conditions;

accepting the transaction reservation for the transaction target via the system for accepting the transaction reservations; and re-presenting bargain data based on the accepted transaction reservation for the transaction target.

15. An apparatus connected with a plurality of terminal devices for accepting a transaction reservation of a transaction target, comprising:

a terms determination unit for determining terms for a transaction of the transaction target for each interval within a predetermined time period based on a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions, where each interval within the predetermined time period reflects temporarily changing conditions of the terms for the transaction; and a display system for displaying the terms for the transaction, wherein transaction reservations are made via the plurality of terminal devices based on the displayed terms for the transaction.

16. A method for accepting a transaction reservation a system for accepting transaction reservations, comprising:

determining and displaying terms for a transaction based on varied intervals within predetermined time periods and a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week, and weather conditions where each of the varied intervals within the predetermined time periods reflects temporarily changing conditions of the terms for the transaction; and accepting a reservation of the transaction for a selected time period, wherein the reservation for the selected time period is accepted via the system for accepting transaction reservations when the selected time period is within the varied intervals within the predetermined time periods reflecting temporarily changing conditions of the terms for the transaction.

17. A computer readable storage medium having a program stored therein to execute operations via a system for accepting transaction reservations, comprising:

displaying terms for a transaction correspondingly adjusted based on varied intervals within predetermined time periods reflecting temporarily changing conditions of the terms for the transaction and a rate of reservation which is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions where the reservation for the selected time period is accepted via the system for accepting transaction reservations when the selected time period is within the varied intervals within the predetermined time periods displayed.

18. A computer readable storage medium having a program stored therein to cause a computer to execute operations including accepting a transaction reservation, comprising:

defining terms of a transaction for a first time interval and a second time interval within a specified time period based on a respective rate of reservation to reflect changes to factors reducing the terms of a transaction occurring at the first time interval and the second time interval; and accepting a transaction reservation with respect to the transaction for a selected time interval when the selected time interval of the transaction reservation is within the first time interval and/or the second time interval;

wherein the rate of reservation is obtained by dividing a reservation number by a number representing a difference between a target number of persons and a number of persons without reservations, wherein said number of persons without reservations is calculated by a product of a prospective number of persons and coefficients defined for factors reducing a transaction including days of a week and weather conditions.

* * * * *